No. 623,906. Patented Apr. 25, 1899.
A. HUNTER & C. GUSTAFSON.
ELECTRIC ACTUATING MECHANISM FOR STATION INDICATORS.
(Application filed July 26, 1897.)

(No Model.) 2 Sheets—Sheet 1.

Witnesses. Inventor.
Andrew Hunter
Crest Gustafson
By Smith & Osborn
their Attys.

No. 623,906. Patented Apr. 25, 1899.
A. HUNTER & C. GUSTAFSON.
ELECTRIC ACTUATING MECHANISM FOR STATION INDICATORS.
(Application filed July 26, 1897.)
(No Model.) 2 Sheets—Sheet 2.
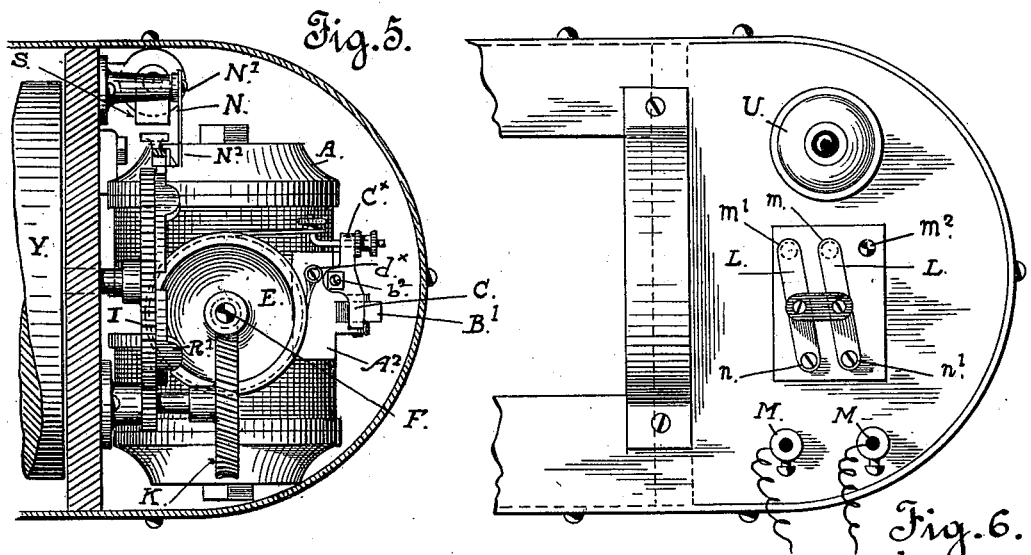
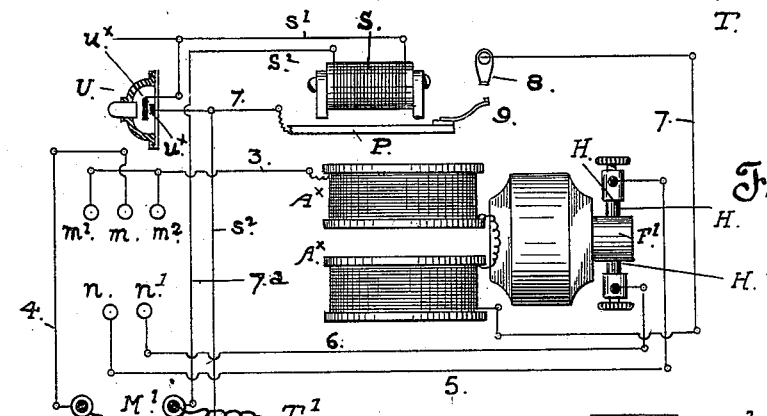
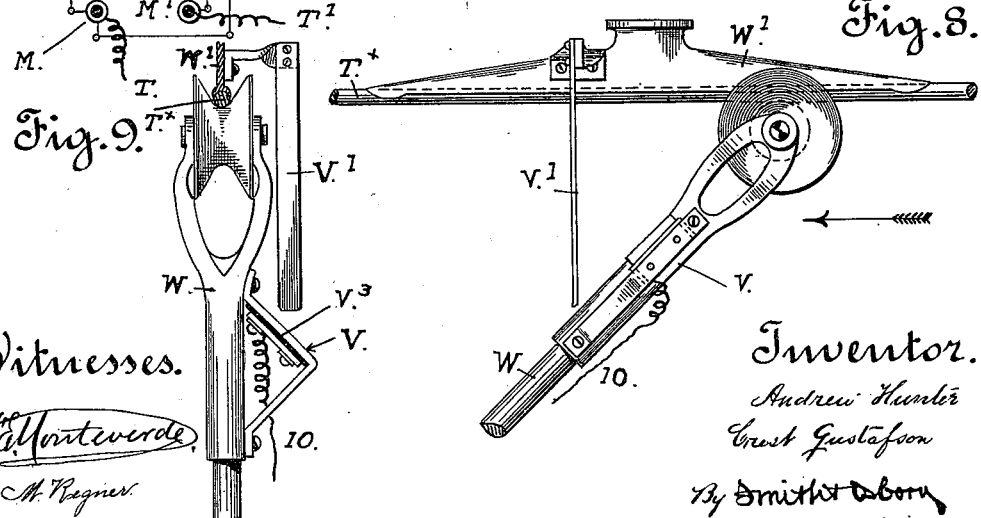
Witnesses.
Inventor.
Andrew Hunter
Ernest Gustafson
By Smith & Osborn
their Attys.

UNITED STATES PATENT OFFICE.

ANDREW HUNTER, OF SAN FRANCISCO, AND CREST GUSTAFSON, OF OAKLAND, CALIFORNIA.

ELECTRIC ACTUATING MECHANISM FOR STATION-INDICATORS.

SPECIFICATION forming part of Letters Patent No. 623,906, dated April 25, 1899.

Application filed July 26, 1897. Serial No. 646,034. (No model.)

*To all whom it may concern:*

Be it known that we, ANDREW HUNTER, residing in the city and county of San Francisco, and CREST GUSTAFSON, residing in Oakland, county of Alameda, State of California, citizens of the United States, have invented certain Improvements in Electric Actuating Mechanism for Station-Indicators, of which the following is a specification.

This invention relates to automatic mechanism for operating a station-indicator in a railway-car; and the invention embraces certain novel parts and combination of parts producing an automatic mechanism for actuating a street or station indicator in an electric-railway car from the propelling-current of the car; also, a novel construction and combination of self-acting brake for bringing an electric motor to a full stop instantaneously when the current is cut off; also, a novel construction and combination of electric circuits and mechanism actuating an indicator in an intermittent manner at required intervals from the propelling-current of the car to properly indicate the streets or stations along the route, all as hereinafter fully explained and set forth.

The nature of these said improvements and the manner in which we proceed to construct, produce, and apply the same to actuate an indicator in a railway-car propelled by electricity will be understood from the following description and the accompanying drawings, referred to therein and forming part of this specification.

Figure 1:
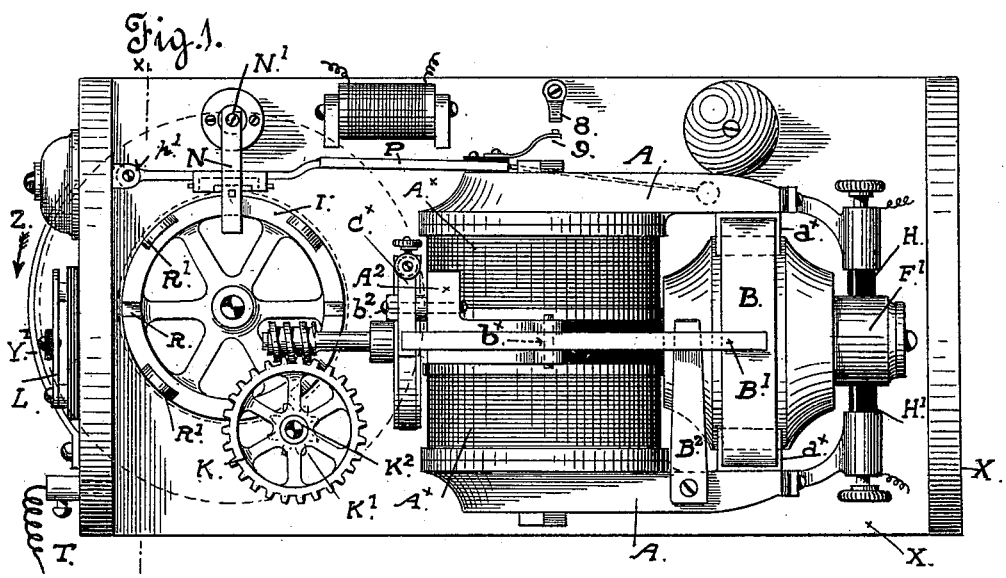
Figure 2:
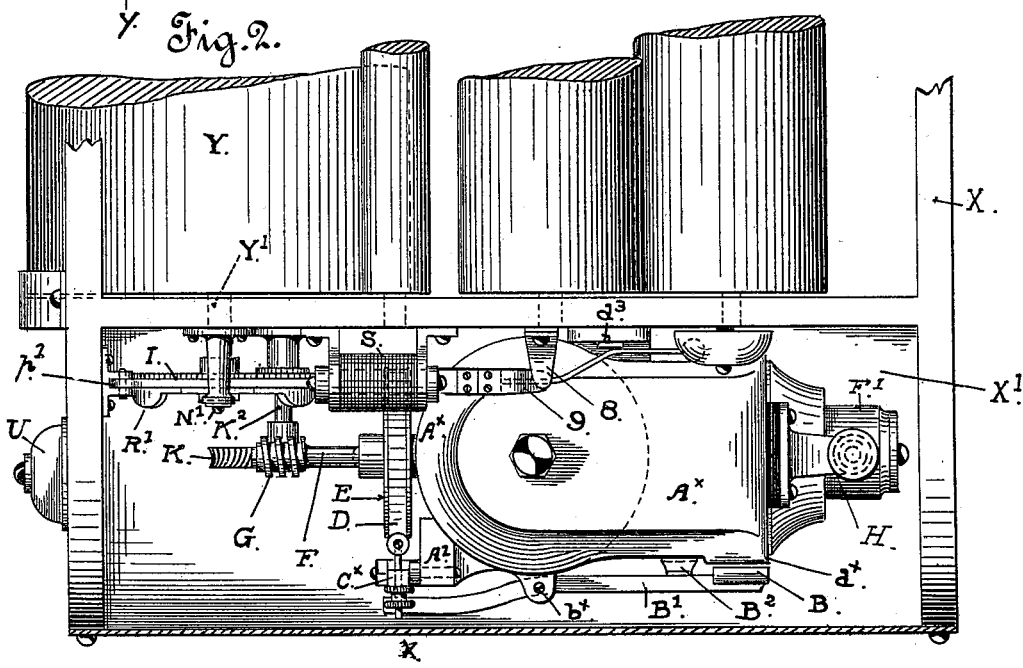
Figures 3, 4:
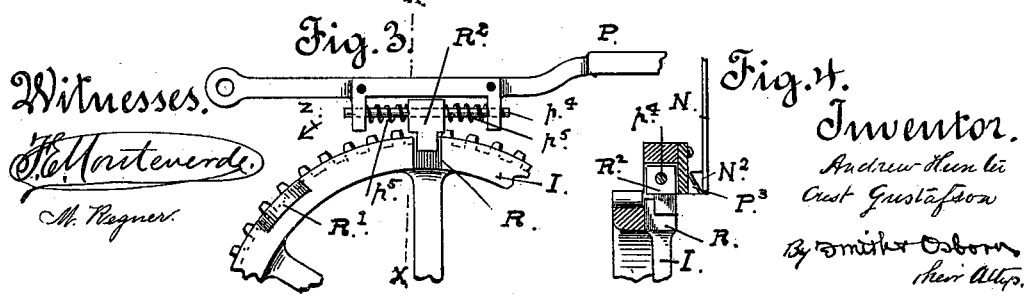

In the said drawings, Figure 1 represents in front elevation an indicator-actuating mechanism embodying our said improvements and applied to work a station-indicator from the propelling-circuit of the car, the mechanism being set in a compartment provided for it on one end of the indicator-case. Fig. 2 is a plan or top view of said compartment with the top removed and the automatic mechanism in place. Portions of the rollers that operate the band or apron containing the names of the stations are shown in the figure. Figs. 3 and 4 are details, on an enlarged scale, of the stop-wheel and its locking-lever that form part of the controlling mechanism, Fig. 4 being a vertical cross-section at $x\ x$, Fig. 3. Fig. 5 is a vertical cross-section taken through the line $x\ y$ near the left-hand side of Fig. 1. Fig. 6 is a front view taken from the left-hand side of Fig. 7. Fig. 7 is a diagram of the main circuit that operates the motor and the auxiliary or branch circuit that controls and regulates the flow of the current to the motor-circuit. Fig. 8 is a front elevation, and Fig. 9 a side elevation, of the contacts on the trolley of the car and on the main conductor or line wire, which form part of the automatic stopping and starting mechanism of the motor.

That part or feature of our present invention which relates to the construction of the motor comprises a novel brake device in combination with the armature-shaft of an electric motor. The construction and operation of this brake will be understood from Figs. 1, 2, and 5 of the drawings. The frame A of the motor is separated at $a^\times\ a^\times$ on the front side, and the two poles formed at these points are joined electrically by a flat bar-armature B on one end of a lever B' of the first order, having a fulcrum at $b^\times$ on a block $A^2$, secured to the motor-frame. This block also furnishes a support for a short lever C, set upright against the perpendicular end of the block and working on a pivot $b^2$. The lower arm of lever C extends downward behind the end of the lever B', and a spring $B^2$, bearing against one arm or member of the lever B', holds the opposite end against the lever C. To the upper end $C^\times$ of lever C is attached one end of a metal strap D, encircling a friction-drum or flanged wheel E, the other end of the strap being attached at $d^\times$ to the fixed block $A^2$. The drum E is fast on the armature-shaft F outside of the motor-frame, and the outer end of the shaft is connected by gearing with the shaft or part to be actuated. As thus constructed the pressure of the lever B' against the end of the lever C puts tension on the brake-strap to a sufficient extent or degree to arrest the motion of the armature-shaft and bring it to a full stop on the instant when the current is cut off from the motor. The brake is kept on by the spring-lever B' as long as the motor is not energized; but as often as the motor-circuit is closed the frame becomes energized, and the armature B, attracted by the poles $a^×$ $a^×$, takes off the pressure of the lever B' from the lever C, and the brake-strap is thus loosened on the drum E. This condition continues as long as the frame remains magnetized. This brake acts instantaneously at the moment of cutting off the current from the motor, and in like manner it releases the shaft as often as the circuit is closed on the motor. It brings the shaft to a full stop and holds it at rest whenever the motor-circuit is cut off or broken.

Another part or feature of the invention relates to the circuit actuating the motor and an automatic circuit making and breaking mechanism by which the current is thrown upon the motor at the required intervals of distance in the run of the car to properly work the indicator and is cut off at the end of the movement that brings the indicator belt or band into position at the sight-opening. The construction and arrangement of this mechanism and the connections of the circuits through which the same act to control the motor will be understood by reference to Figs. 1, 2, and 7.

$A^×$ $A^×$ indicate the bobbins, and A the frame of a small series-wound electric motor of the usual construction, excepting that the frame is split or separated at $a^×$ $a^×$, as hereinbefore described.

F is the armature-shaft, mounted to rotate in bearings on the frame and carrying on one end a worm G and on the opposite end the commutator F' between the brushes H H'. The motor is fastened at $a^3$ to the side of the compartment X' on the end of the indicator-case X, and the axle Y' of the drum or roller Y, that gives movement to the indicator apron or band, is geared into the shaft F by a spur-wheel I on the roller-shaft and a worm-wheel K and pinion K' on a stud or short shaft $K^2$. These parts constitute the indicator driving or rotating mechanism. As often as the current is thrown on the motor the roller Y is rotated either forward in the direction of the arrow Z, Fig. 1, or backward, according to the direction in which the current of the propelling-circuit of the car is caused to flow through the motor. Connection between the motor and the trolley-circuit of the car is made through a reversing-switch composed of the coupled circuit-closing springs L $L^×$ and the contact-points $m$ $m'$ $m^2$.

The contact-points $m'$ $m^2$ of the switch are made the terminals of the windings of one bobbin by a connecting-wire 3, while the middle contact $m$ is connected to a binding-post M on the case below the switch by a wire 4. From the pivot $n$ of the lever L connection is made to the brush H by a wire 5, and from the pivot $n'$ of the other lever a wire 6 is carried to the brush H'.

The winding of the motor-magnets is carried from the lower bobbin to a second binding-post M' by a conductor composed of wires 7 $7^a$, an oscillating lever P, and contact-springs 8 9, one on the side of the indicator-case and the other on the free end of the lever P. The binding-post M is connected by a wire T into the trolley-circuit, and from the post M' a wire T' is carried to a "ground." Thus the motor becomes energized when the circuit is closed at the contacts 8 9 by raising and holding up the lever P, or the current is cut off when those two contacts are separated. The movements of the lever P to connect the motor into and disconnect it from the main circuit are produced and controlled automatically by a relay S in a branch or separate circuit taken from the line-wire and normally open, but including a circuit-closer, one part, V, of which is mounted on the trolley W and the other part, V', on the bell or line-wire carrier W'. The contact-piece V is mounted on one side of the pole of the trolley just below the yoke and is insulated at $V^3$ from the supporting-bracket. The other contact-piece V' consists of a spring or yielding strip stationary as to position on the line-wire carrier and from that support depending in the path of the contact-piece on the trolley-pole. From the last-mentioned piece a wire 10 is carried down along the trolley-pole to the wire connecting with the positive side of the relay S. Through these connections the relay becomes momentarily energized by the contact of the piece V on the trolley-pole with one of the strips V', which are located along the line at intervals apart and at those points along the route where the indicator is to be actuated, and thus the lever P is lifted by magnetic attraction toward the poles of the magnet S as often as the circuit is closed through the contacts V V', and by the movement of the lever P the circuit is closed at 8 9. In this elevated position after the magnet S has ceased to act the lever is maintained by a stop-wheel I on the axle of the indicator-drum Y' for a suitable period of time to run the motor and operate the indicator.

The construction and operation of this mechanism are substantially as follows: The stop-wheel is geared into the armature-shaft, as shown in Figs. 1, 2, and 5 and as hereinbefore described. On its rim are notches or open slots R, situated at regular distances apart, and at points between these slots and on the side of the rim are fixed cams or projections R', standing out from the face of the wheel. The lever P, oscillating on a pivot $p'$, is situated directly over and in line with the wheel I and is provided with a dog or detent-piece $R^2$, set in a recess in the lower side, in line with the rim of the stop-wheel and adapted to ride on the rim of the wheel in one position of the lever and to fit in the slots of the wheel when the lever is dropped. In addition to its function of making and breaking the circuit the lever P serves as a stop-lever to arrest the motion of the indicator-drum and regulate its starting-point at each time of its movement, whether in the forward direction or in the contrary direction, whenever the current is reversed on the motor. In the action of the magnet S when the current is closed through it by contact of the two parts V V', the lever P is lifted a sufficient distance to raise the dog $R^2$ clear of the rim of the stop-wheel; but as this attractive force of the magnet is limited to the short interval of contact between the piece V on the moving trolley and the piece V' on the stationary support of the line-wire, and which is necessarily of very short duration under the rapid speed of the car, provision is made for holding up the lever P after the current ceases to flow through the magnet S and for a suitable length of time to allow the motor to get under way and turn the stop-wheel until the slot from which the stop-lever was raised is disengaged and carried out of line with the dog and the smooth portion of the rim comes under the end of the dog. The device for this purpose consists of a spring-latch N, attached to the case at N' and having an angular tooth $N^2$ with an inclined bottom face and a flat top on the side next the wheel and a tooth $P^3$ on the front side of the lever similarly shaped, but set in reversed position, so as to bring the inclined faces of these two parts $N^2 N^3$ together. When the lever is at rest and its dog engages the notch in the rim of the wheel, the tooth on the spring lies upon the corresponding tooth on the lever, as shown in Figs. 3 and 5; but in the upward movement of the lever its tooth $N^2$ will catch under the tooth $P^3$ and hold up the lever. In this position the lever remains elevated clear of the stop-wheel until the spring N is struck by the nearest cam on the side of the wheel. In the interval between the first attraction of the lever by the magnet S and the contact of the nearest cam with the spring N the lever-dog R' is held clear of the stop-wheel, and as the spring N is pressed outward by the cam the lever is dropped down upon the wheel, bringing the dog into riding contact with the wheel-rim and into position to drop into the next notch. Instead of being rigidly fixed the dog is attached to the lever by a yielding connection, so as to have a limited longitudinal movement at the time of engagement with the notch of the wheel, and thus act to check and stop the wheel without bringing the parts to an abrupt and sudden stop. For this purpose the dog $R^2$ is mounted to slide on a guide-bar $p^4$ in the recess in the lever, and springs $p^5 p^5$ on the bar are placed between the ends of the recess and the dog to press equally upon opposite sides and hold the dog in a central position. This construction is shown in Figs. 3 and 4 of the drawings.

Provision is made for closing the motor-operating circuit by hand at any time independently of the automatic mechanism by placing in the relay-circuit a push-button V to be operated from the front of the indicator. To the contact-springs $U^\times U^{\times\times}$ of this part U are connected, as shown in the diagram Fig. 7, the wires $7^a$ of the motor-circuit and the wires $S' S^2$ of the relay-circuit in such manner that the relay-circuit is closed upon the trolley-circuit and the ground at the two binding-posts M M' instead of that circuit being closed at the contacts on the trolley-pole and the line-wire above. By this means the actuating mechanism is placed directly under the control of the train-hands to be operated at any time independently of the automatic device carried on the trolley-pole, so that the indicator can be readily set to bring the name of any desired station to view at the sight-opening. This attachment, in connection with the reversing-switch L L', places the mechanism under complete control of the man in charge of the train.

It should be mentioned that the operating mechanism can be reversed automatically at the end of the road or at any point in the run of the car when the direction of travel is reversed by mounting the parts of a reversing-switch upon the trolley-stand, so that when the trolley-pole is swung around to the opposite position the connection between the motor and the line-circuit will be reversed, the result of which will be to change the direction of flow of current through the motor and reverse the motion. A simple construction of reversing-switch combined with the trolley-stand and trolley-pole for this purpose is described and claimed in a prior application for Letters Patent filed by us on the 29th day of March, 1897, Serial No. 629,821.

It is obvious that the same mechanism can be applied to operate indicators on cars not propelled by electricity by simply connecting the mechanism to a local battery provided on the car, provision in such case being made for closing the circuit at intervals along the route by a circuit-closing lever set to make contact and be actuated to close the electric circuit by stationary projections placed on the surface of the roadway.

Having thus fully described our invention, what we claim as new, and desire to secure by Letters Patent, is—

1. The combination of the stop-wheel having slots in its rim, a stop-lever, a spring-detent on the stop-lever, an electric motor having its armature-shaft geared into the stop-wheel, a motor-actuating circuit including said stop-lever, an auxiliary or branch circuit including a circuit-closing device and a relay adapted to act on the stop-lever and raise it from the stop-wheel, a spring-latch adapted to engage and hold up the lever when that part is lifted by its relay, and projections on the stop-wheel operated by the rotative movement of said wheel to throw off the latch and release the stop-lever.

2. The combination, with the stop-lever having slots in its rim; of the stop-lever, spring-balanced dog on said lever, means for lifting said lever momentarily clear of the stop-wheel, a spring-latch adapted to engage and hold up the stop-lever when lifted, and projections on the stop-wheel arranged to throw off said latch and drop the stop-lever upon the rim of the wheel in advance of the following slot.

3. The combination, with a street or station indicator; of an electric motor having an armature-shaft geared into an indicator-operating shaft, a motor-operating circuit derived from the propelling-circuit of the car and including a circuit-closing lever normally open, a relay in an auxiliary or branch circuit adapted to operate the circuit-closing lever and close the motor-operating circuit, and a circuit-closing device in said relay-circuit consisting of a contact on the trolley-pole and a contact on the line-wire located at points in the line of the road where the indicator is to be operated and in the path of the contact carried by the trolley-pole, the said relay being connected in circuit with said trolley-pole contact and with a "ground wire," for operation as set forth.

4. An automatic mechanism for operating a station-indicator, consisting of an electric motor having an armature-shaft geared into the operating-shaft of the indicator, a stop-wheel in said connection having slots in its rim, a motor-actuating circuit normally open and including a source of electricity and a stop-lever that is adapted to form a circuit-closing lever, a reversing-switch in said circuit arranged to reverse the current through said motor and change the direction of rotation of the armature-shaft, a relay in an auxiliary or branch circuit normally open and in which is included a circuit-closing device, said relay being adapted to attract the stop-lever by the closing of the relay-circuit and by its movement to release the stop-wheel and close the motor-operating circuit.

In testimony that we claim the foregoing we have hereunto set our hands and seals.

ANDREW HUNTER. [L. S.]
CREST GUSTAFSON. [L. S.]

Witnesses:
EDWARD E. OSBORN,
JAMES L. KING.